June 27, 1967 P. H. CLEFF 3,327,555
MOUNTING OF CASES EPICYCLIC GEARS
Filed March 2, 1965 2 Sheets-Sheet 1

Inventor
Peter H. Cleff

June 27, 1967 P. H. CLEFF 3,327,555
MOUNTING OF CASES EPICYCLIC GEARS
Filed March 2, 1965 2 Sheets-Sheet 2

Inventor
Peter H. Cleff
By
Atty.

United States Patent Office 3,327,555
Patented June 27, 1967

3,327,555
MOUNTING OF CASES FOR EPICYCLIC GEARS
Peter H. Cleff, Gosforth, England, assignor to Pametrada, Wallsend, Northumberland, England, a British body corporate
Filed Mar. 2, 1965, Ser. No. 436,589
Claims priority, application Great Britain, Mar. 9, 1964, 9,940/64
3 Claims. (Cl. 74—606)

The present invention relates to epicyclic gears and is concerned with the mounting of such gears to facilitate access and servicing, especially in the case of large gears where the parts are bulky and heavy.

Epicyclic gears are essentially machines which must be assembled and serviced from their ends. Large epicyclic gears, for instance the second reductions of double reduction gears for marine use cannot conveniently be dis-assembled, serviced and re-assembled on board ship because the lack of head room, floor-space and gantry cranes make it impossible to move major components first axially and then transversely whilst simultaneously supporting the shaft with the help of such lifting tackle (e.g. chain blocks, jacks) as can be brought to bear.

According to the present invention, the input shaft, output shaft and gear parts between the two are journalled and supported in a frame equipped with trunnions having their axis transverse to and offset with respect to the main axis of the gear and the frame is supported by the trunnions in bearings on a foundation. Generally, the framework will be constituted by or enclosed in a casing. When it is desired to dis-assemble or maintain the epicyclic gear, its input and output shafts are disconnected from the driving and the driven shafts, the trunnions are freed so as to be rotatable in their bearings and the whole framework is then swivelled on the trunnions. The offset of the trunnion access from the plane of the main axis of the gear is chosen so that having regard to the components carrying the driving and driven shafts, the gear can clear these components when it is swivelled. Such swivelling is generally easy to accomplish and thereafter the gear may be dis-assembled, serviced and re-assembled.

As a general rule, it will be most convenient if the main axis is normally horizontal or approximately horizontal, for the trunnion axis to be horizontal and to be below the main axis. This is particularly the case when the gear in question constitutes a second reduction between a first reduction gear and a screw shaft on a ship. When the input and output shafts have been disconnected and the trunnions have been freed, the gear can be up-ended very easily, e.g. with block and tackle.

Figure 1:
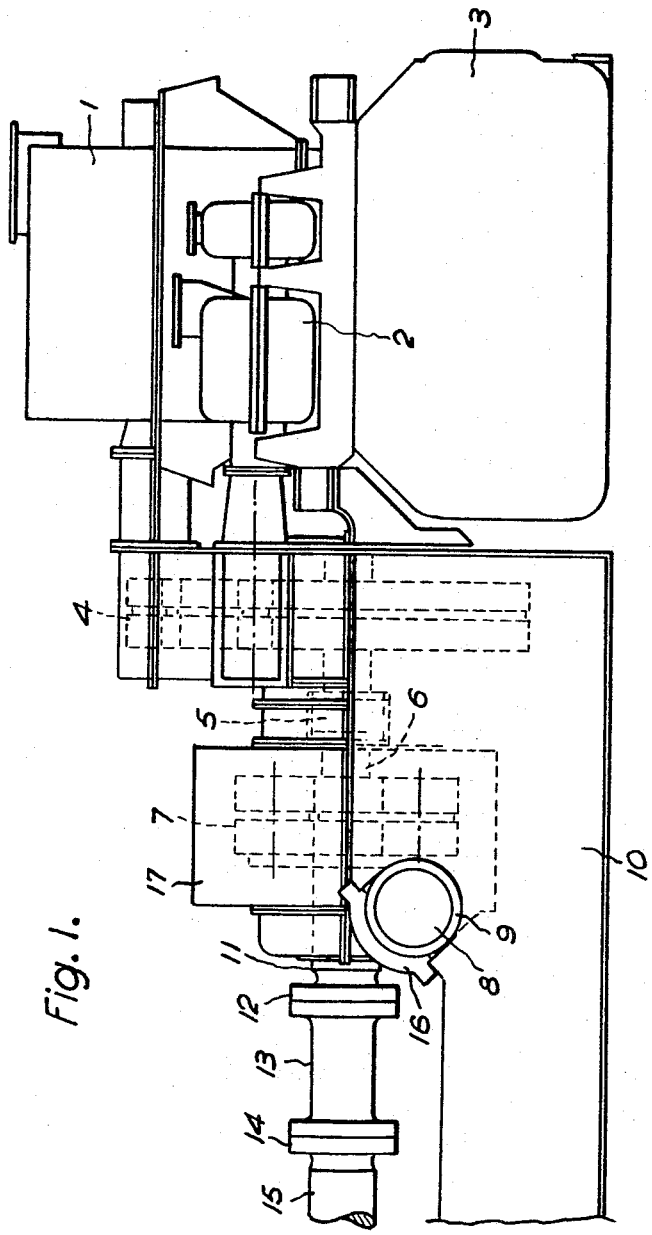
Figure 2:
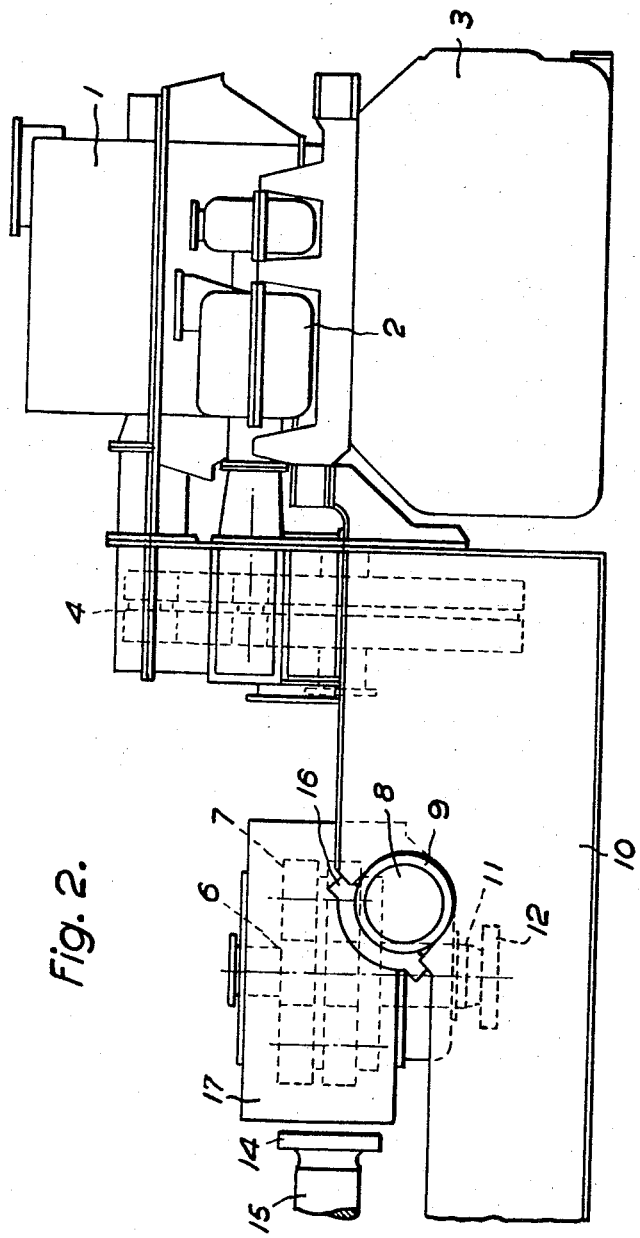

A typical installation of a second reduction gear for marine use is illustrated in the accompanying drawings.
FIGURE 1 is a side view with the gear in its working position, and FIGURE 2 shows the same plant with the gear swivelled to the servicing position.

In the drawings 1 and 2 indicate position and relative size of typical L.P. and H.P. turbines and 3 the associated condenser. 4 is the co-ordinated first reduction gear, here shown by way of example as of parallel double helical construction. 5 represents a coupling, for instance a fully flexible fine tooth coupling connecting to the central sun pinion 6 of the epicyclic reduction gear 7. A gear box 17 constituting a frame for the epicyclic gear 7, is equipped with horizontal thwartships trunnions 8 resting in bearings 9 which are part of a foundation 10. The output shaft 11 terminates in a flange 12 which is connected through a make up (shaft) piece 13 to the forward terminal flange 14 of the output shaft line 15.

Means 16 are provided to clamp the trunnions 8 when required. The bearings 9 may be equipped with means for adjusting the epicyclic gear unit in a plane transverse with respect to the main gear axis and thus for aligning it with respect to the preceding first reduction gear.

It will be observed that the axis of the trunnions is offset downwardly with respect to the main axis of the epicyclic gear. By this the result is achieved that whilst the epicyclic gear approaches closely to the first reduction gear, it can be swung into the upended position without fouling the first reduction gear box.

What we claim is:
1. A mounting for an epicyclic gear having input and output shafts disposed coaxially on the main axis of the gear and having gear parts interconnecting the two shafts, said mounting including a frame in which said shafts and gear parts are journalled and supported in cooperative relationship, trunnion means on said frame, defining an axis transverse to and offset from said main axis, a foundation, and bearing means on said foundation supporting said trunnion means, whereby said frame can be rocked on the trunnion axis.

2. A mounting for an epicyclic gear according to claim 1, which in normal position has its main axis at least or approximately horizontally disposed and having the trunnion means disposed with their axis horizontal.

3. A mounting for an epicyclic gear according to claim 2 in which the trunnion axis is below the main axis of the gear.

References Cited

UNITED STATES PATENTS

| | | | |
|---|---|---|---|
| 163,338 | 5/1875 | Smith | 74—380 |
| 1,788,602 | 1/1931 | Sutton et al. | 74—802 |
| 3,157,065 | 11/1964 | Isenberg et al. | 74—665 |
| 3,169,413 | 3/1965 | Freeman | 74—625 |

FRED C. MATTERN, JR., *Primary Examiner.*
W. S. RATLIFF, *Assistant Examiner.*